(12) United States Patent
Miyamoto et al.

(10) Patent No.: US 6,725,563 B1
(45) Date of Patent: Apr. 27, 2004

(54) DRYING METHOD, DRYING DEVICE, AND DRYING MACHINE

(75) Inventors: Yoshihisa Miyamoto, Tokyo (JP); Shigemitsu Hayashi, Tokyo (JP)

(73) Assignee: Hakko Co., Ltd., Tokyo (JP)

( * ) Notice: Subject to any disclaimer, the term of this patent is extended or adjusted under 35 U.S.C. 154(b) by 0 days.

(21) Appl. No.: 09/937,896

(22) PCT Filed: Mar. 30, 2000

(86) PCT No.: PCT/JP00/02042

§ 371 (c)(1),
(2), (4) Date: Dec. 4, 2001

(87) PCT Pub. No.: WO00/58677

PCT Pub. Date: Oct. 5, 2000

(30) Foreign Application Priority Data

Mar. 30, 1999 (JP) .............................................. 11-088890

(51) Int. Cl.⁷ ............................................... F26B 11/02
(52) U.S. Cl. .............................. 34/129; 34/127; 34/604; 34/607; 34/86; 34/140
(58) Field of Search .......................... 34/129, 127, 130, 34/131, 132, 134, 138, 140, 595, 604, 607, 86

(56) References Cited

U.S. PATENT DOCUMENTS

| | | | | |
|---|---|---|---|---|
| 3,750,304 A | * | 8/1973 | Ghadiali ...................... | 34/566 |
| 3,902,254 A | * | 9/1975 | Files ........................... | 34/126 |
| 4,159,306 A | * | 6/1979 | Borst .......................... | 422/210 |
| 4,204,338 A | * | 5/1980 | Bullock ....................... | 34/467 |
| 4,346,523 A | * | 8/1982 | Ronning ..................... | 34/418 |
| 4,665,628 A | * | 5/1987 | Clawson ..................... | 34/449 |

FOREIGN PATENT DOCUMENTS

| | | |
|---|---|---|
| JP | 56-77675 | 6/1981 |
| JP | 59-108597 | 6/1984 |
| JP | 6-58900 | 8/1994 |
| JP | 10-192594 | 7/1998 |

* cited by examiner

*Primary Examiner*—Ira S. Lazarus
*Assistant Examiner*—Kathryn S. O'Malley
(74) *Attorney, Agent, or Firm*—Heller Ehrman White and McAuliffe (57) ABSTRACT

A drying method, a drying device, and a drying machine, capable of remarkably reducing a drying time by assigning the standby time for an article to be dried to a preliminary drying time in drying, wherein hot air is supplied to the drying machine so as to dry the article to be dried and, at the same time, hot air exhausted from the drying machine is led into a preliminary drying machine so as to preliminarily dry the article to be dried before drying, and then the article to be dried contained in the preliminary drying machine is fed to the drying machine for drying.

4 Claims, 8 Drawing Sheets

DRYING METHOD, DRYING DEVICE, AND DRYING MACHINE

FIELD OF THE INVENTION

The present invention relates to a method, a device, and a machine for washing and drying a linen product such as a towel, and more specifically a method, a device, and a machine for realizing a remarkable reduction of a drying time.

BACKGROUND OF THE INVENTION

A linen product such as a dirty towel is carried by a conveyor to a washing machine, and then fed and washed in the washing machine, and further transferred to a drying machine after spin-drying, and next to that fed and dried in the drying machine.

A conventional drying machine comprises a rotary drum containing a wash in a chamber, a steam heater for supplying a blow of hot air into the chamber, and an exhaust fan for ventilating the interior of the chamber, wherein the blow of hot air raised up to a high temperature through heat-exchange in the steam heater is blown in the wet wash fed within the rotary drum, and at the same time, the blow of hot air cooled down to a low temperature after having been blown in the wash is exhausted to make the wash dried out.

Conventionally, the wash to be dried next is made to stand by in front of the drying machine in order to obtain high washing efficiency while the wet wash is being dried in the drying machine, and the wash on standby is thrown into the drying machine immediately after taking out the already dried wash.

However, since the wash to be dried next is made to stand by in front of the drying machine (for example, standby time is about 15–20 minutes) during drying the wash in the drying machine as described above, a total drying time requires a time resulting in poor washing efficiency.

Moreover, when the next wash is made to stand by in front of the drying machine until the preceding wash is dried out, the wash in the wet state decreases in a temperature by further cooling before it is thrown into the drying machine. Therefore, the time required for drying out the wash becomes far longer to result in poorer efficiency.

DISCLOSURE OF THE INVENTION

The present invention is a method that a blow of hot air exhausted from a drying machine is utilized to preliminarily dry an article to be dried which has been thrown in a preliminary drying machine by the blow of hot air before final drying. That is to say, while a blow of hot air is supplied to the drying machine so as to finally dry the article to be dried, a blow of hot air exhausted from the drying machine is introduced into the preliminary drying machine so as to preliminarily dry the article to be dried before final drying, and then the article to be dried contained in the preliminary drying machine is transferred to said drying machine for final drying.

The blow of hot air introduced during final drying is, for example, at a high temperature of about 160° C., and the blow of hot air exhausted comes to about 100° C. When the temperature of the hot air exhausted is about 100° C., it is enough to preliminarily dry a wet article to be dried after having been washed.

In this way, since the article to be dried before final drying is dried using the blow of hot air generated during the final drying, while the final drying is proceeding, a drying time during final drying of the preliminarily dried article to be dried can be remarkably reduced resulting in a high drying efficiency.

DESCRIPTION OF THE PREFERRED EMBODIMENT

Hereinafter, described in details are specific embodiments to which the present invention is applied, referring to the drawing.

<Embodiment 1>

Figure 1:
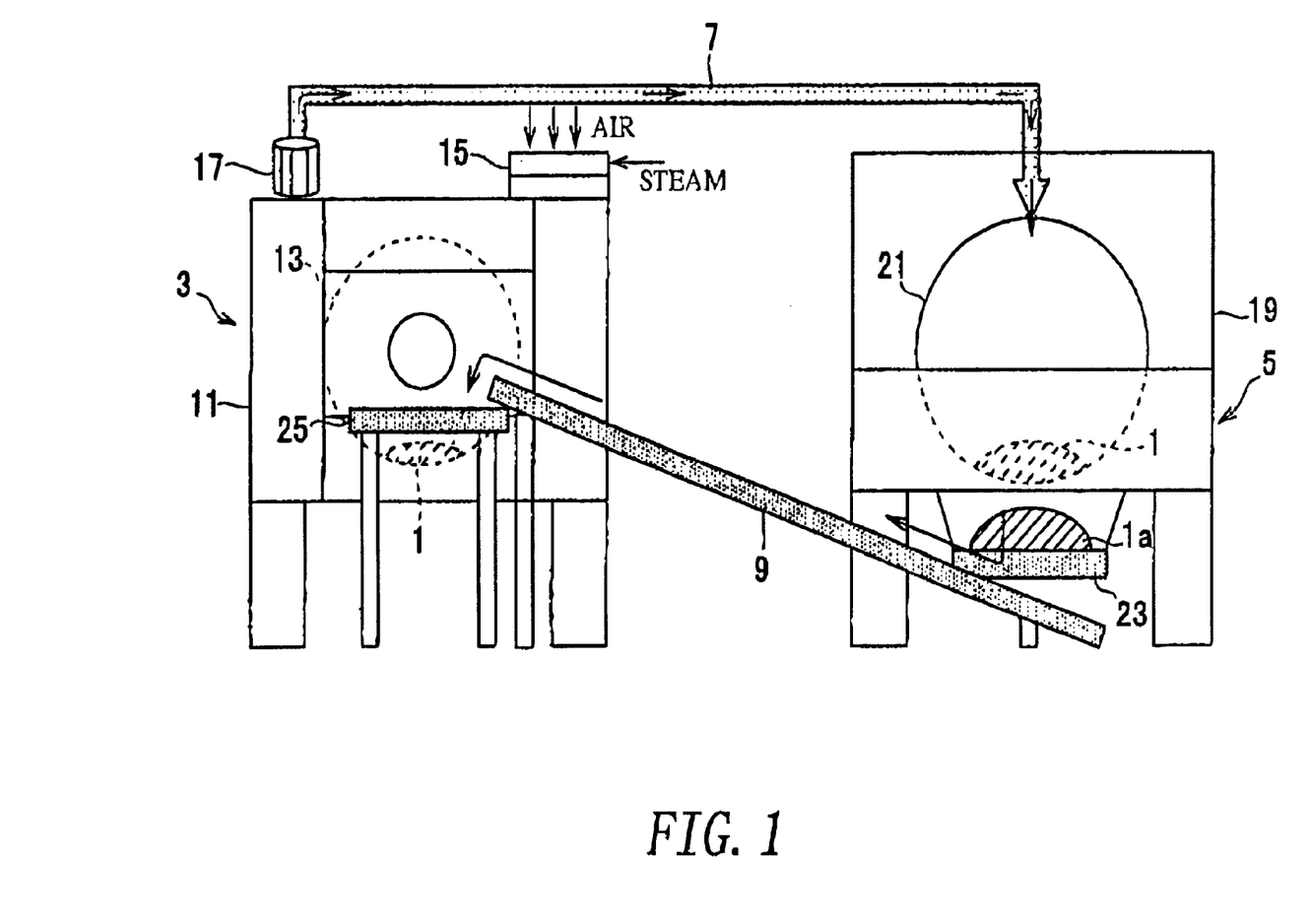
FIG. 1 is a schematic diagram showing a drying device of the embodiment 1.

A drying device of the present embodiment comprises, as shown in FIG. 1, a final drying machine 3 for finally drying a wet article to be dried 1 which is spin-dried after washing, a preliminary drying machine 5 spaced out a prescribed distance adjoining the final drying machine 3 for preliminarily drying the article to be dried 1 before final drying, an exhaust-introducing pipe 7 being an exhaust-introducing member for introducing a blow of hot air exhausted from the final drying machine 3 into the preliminary drying machine 5, and a conveyor 9 being transfer means for transferring a preliminarily dried article to be dried 1a from the preliminary drying machine 5 to the final drying machine 3.

The final drying machine 3 described above comprises, as shown in FIG. 1, a chamber 11 composing the drying machine body, a rotary drum 13 free to rotate in the chamber 11, a steam heater 15 being hot air supply means for supplying a blow of hot air into the chamber 11 described above, and an exhaust fan being exhaust means for exhausting the interior of the chamber 11.

The above rotary drum 13, as shown in FIG. 1, is configured as a drum whose belly portion is formed to be a mesh-like cylinder, and also configured to be able to rotate within the above chamber 11 via a servomotor controllably driven by a control-means not illustrated in the figure.

Further, a carrying-out door (not shown in the figure) for carrying out the finally dried article to be dried 1 is provided at the bottom portion opposing to an article inlet of the rotary drum 13.

The above steam heater 15 is, as shown in FIG. 1, a so-called heat exchanger, provided on the top surface of the above chamber 11, which forms a blow of hot air at high temperature using air introduced into the chamber 11 via exhausting the interior of the chamber 11 by an exhaust fan 17 described below and steam introduced from the exterior. For example, the steam heater 15 generates a blow of hot air at about 160° C.

The above exhaust fan 17, as shown in FIG. 1, being means for exhausting the interior of the chamber 11, is provided opposing to the above steam heater 15 on the top surface of the chamber 11. The hot air exhausted by this exhaust fan 17 is cooled down to a low temperature through having been blown in the article to be dried 1 when the blow of hot air at a high temperature is supplied into the chamber 11. For example, the temperature of the blow of hot air exhausted is about 100° C. When the blow of hot air is at around this temperature, it is capable to preliminarily dry sufficiently the article to be dried 1 before final drying.

The above preliminary drying machine 5 described above comprises, as shown in FIG. 1, a chamber 19 composing the drying machine body; and a rotary drum 21 free to rotate in the chamber 11, and includes the almost same composition as that of the above final drying machine 3. Besides, in the preliminary drying machine 5 provided is an exhaust fan 17 (not shown in the figure) for exhausting the interior of the preliminary drying machine 5, but no steam heater 15 is provided, and when an existing drying machine is used, a steam heater 15 will be stopped operating even if the steam heater 15 is provided therein.

The above rotary drum 21 has the almost same composition as that of the rotary drum 13 of the final drying machine 3, and further has a door (not shown in the figure) for dropping down a preliminarily dried article to be dried 1a on a carrying-out conveyor belt 23 provided on the bottom surface of the chamber 19.

The above exhaust-introducing pipe 7 is, as shown in FIG. 1, disposed extending from the exhaust fan 17 of the final drying machine 3 to the top surface of the preliminary drying machine, and acts as means for introducing hot air exhausted from the final drying machine 3 into the chamber 19 of the preliminary drying machine 5.

The above conveyor 9 is, as shown in FIG. 1, provided between the above final drying machine 3 and the preliminary drying machine 5 for receiving the preliminarily dried article to be dried 1a from the above carrying-out conveyor belt 23 to deliver the article on to a carrying-in conveyor belt 25 disposed in front of the final drying machine 3.

Next, described will be a drying method using a drying device with the above-mentioned composition. At first, washed and spin-dried articles to be dried 1 are fed into the rotary drums 13, 21 respectively, of the final drying machine 3 and the preliminary drying machine 5. Then, the interior of the chamber 11 is exhausted by the exhaust fan 17, and the rotary drum 13 is actuated to rotate, while a blow of hot air at a high temperature is supplied into the chamber 11 by the steam heater 15. At the same time, the rotary drum 21 of the preliminary drying machine 5 is also actuated to rotate.

Accordingly, a blow of hot air exhausted from the final drying machine 3 is introduced through the exhaust-introducing pipe 7 into the preliminary drying machine 5 and the article to be dried 1 in the preliminary drying machine 5 is dried by this blow of exhausted hot air, while the drying to be dried 1 is dried by the blow of hot air at a high temperature in the final drying machine 3. That is to say, the washed and spin-dried article to be dried 1, which will be finally dried next, is preliminarily dried in the preliminary drying machine 5 while final drying is proceeding in the final drying machine 3.

And, once the article to be dried 1 is dried out, the final drying machine 3 stops and the preliminary drying machine 5 interlocked with it also stops. The finally dried article to be dried 1 is discharged from the rear portion of the rotary drum 13. On the other hand, after the preliminarily dried article to be dried 1a is dropped on to the carrying-out conveyor belt 23 through the opened door disposed on the rotary drum 21, it is transferred on to the carrying-in conveyor belt 25 disposed in front of the final drying machine 3 via the conveyor 9.

Subsequently, the preliminarily dried article to be dried 1a is thrown into the rotary drum 13 of the final drying machine 3 via the carrying-in conveyor belt 25. On the other hand, the washed and spin-dried next article to be dried 1 is thrown into the rotary drum 21 of the preliminary drying machine 5.

In this way, the blow of hot air exhausted from the final drying machine 3 is introduced into the preliminary drying machine 5 for preliminarily drying the article to be dried 1 before final drying which is fed in the preliminary drying machine 5, while the washed and spin-dried article to be dried 1 is being finally dried in the final drying machine 3, and then the preliminarily dried article to be dried 1a is transferred into the final drying machine 3 to finally dry it off, and therefore the next article to be dried 1, which will be finally dried next, can be preliminarily dried while final drying is proceeding, and remarkable reduction of a drying time can be realized.

Further, in this embodiment, conventional standby time of the next article to be dried 1 in front of the final drying machine 3 during the preceding final drying can be assigned to preliminary drying time, and therefore final drying starts from a somewhat dried state, resulting in remarkable reduction of a drying time necessary for an ultimately cooled down state due to the standing by. Moreover, since hot air at a high temperature exhausted from the final drying machine 3 is not emitted directly into the atmosphere but emitted at a low temperature after using the hot air for preliminary drying, the method is also friendly to the environment.

Furthermore, the drying device of the present embodiment can employ a conventional existing drying machine, and can be easily composed by adding only the conveyor 9 thereto. And, in this drying device, since the blow of hot air generated by the stream heater 15 is efficiently utilized, energy-saving can be attained.

<Embodiment 2>

Figure 2:
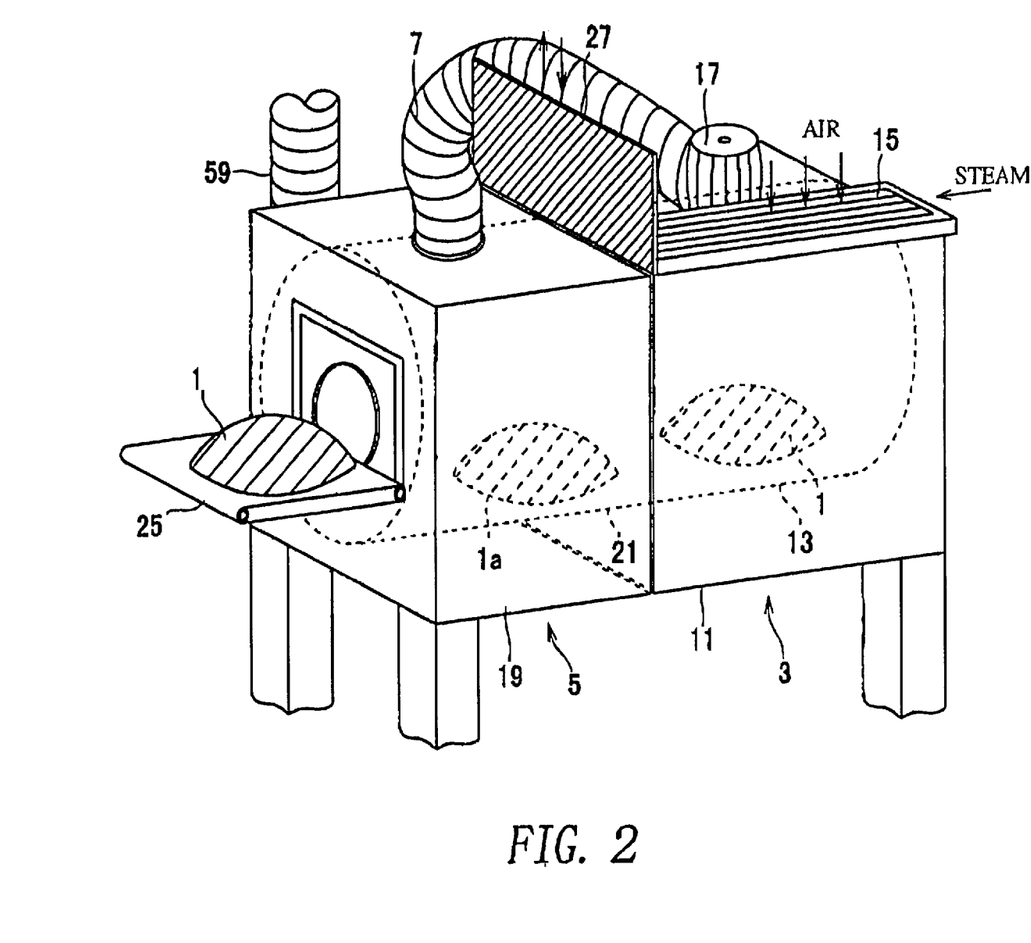
FIG. 2 is a perspective view showing a drying device of the embodiment 2.

A drying device of the present embodiment is different from the drying device of the embodiment 1 where the final drying machine 3 and the preliminary drying machine 5 are located in parallel a prescribed distance apart from each other, but it is otherwise configured, as shown in FIG. 2, composition wherein a final drying machine 3 and a preliminary drying machine 5 are located adjacently in series each other.

Besides, with regard to the present embodiment, matters different from the embodiment 1 are only described and the description of the common matters will be omitted.

With regard to the drying device of the present embodiment, the final drying machine 3 and the preliminary drying machine 5 are located in series adjoining each other, and a shutter 27 as a shield is configured to be free to move up and down at the butt portion of these drying machines 3, 5 in order to make the drying machines 3, 5 communicate each other or independent of each other. When the shutter 27 is lowered, the butt portion of the final drying machine 3 and the preliminary drying machine 5 is shielded to make the final drying machine 3 independent of the preliminary drying machine 5. On the other hand, when the shutter 27 is raised, the butt portion of the final drying machine 3 and the preliminary drying machine is opened to make the final drying machine 3 and the preliminary drying machine 5 communicated with each other.

Figure 3:
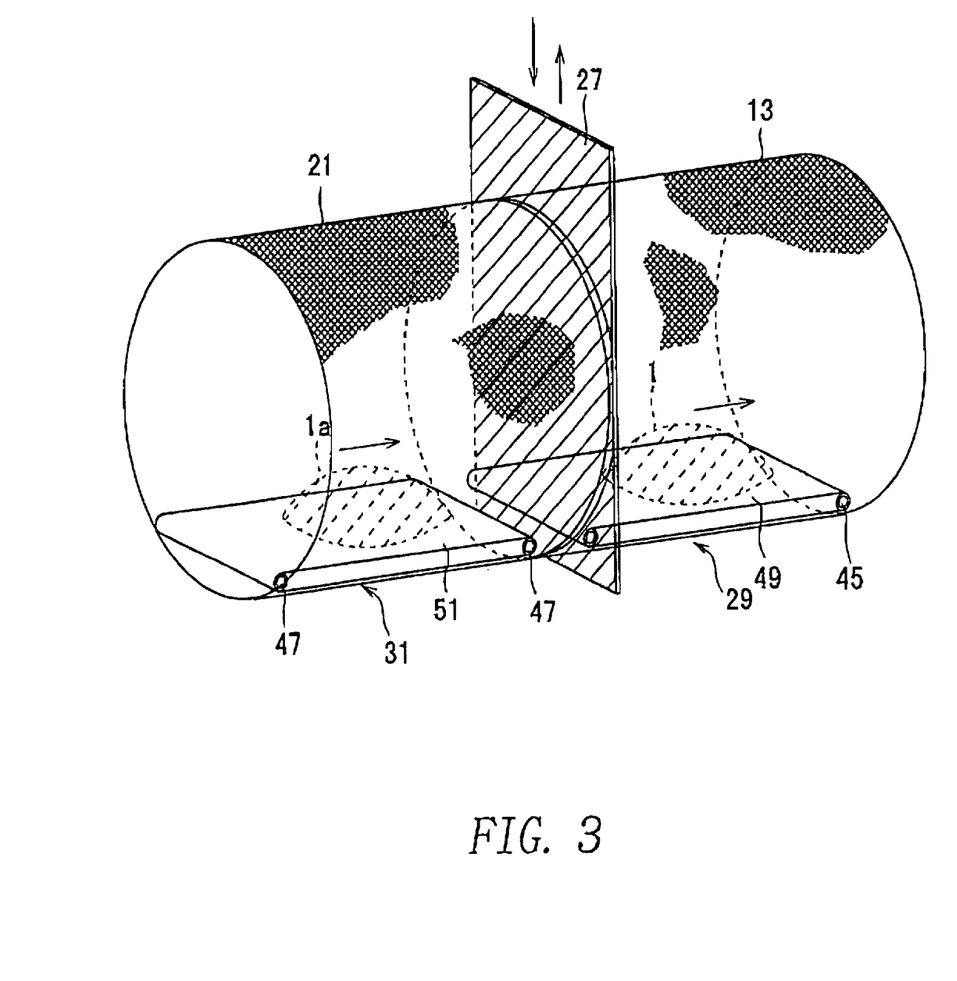
FIG. 3 is a perspective view showing a rotary drum portion picked out from the drying device of the embodiment 2.

Further, regarding the drying device of the present embodiment, as shown in FIG. 3, within the final drying machine 3 and the preliminary drying machine 5 respectively disposed are transfer conveyor belts 29, 31. These transfer conveyor belts 29, 31 have rollers 45, 47 axially supported, to be free to rotate, by bearings (not illustrated in the figure) provided within rotary drums 13, 21, and are configured to rotate together with the rotary drums 13, 21. Moreover, the transfer conveyor belts 29, 31 are configured so as to make the rollers 45, 47 rotate by driving sources (not illustrated in the figure) contained within the rollers 45, 47, and consequently to make belts 49, 51, which are wound around the rollers 45, 47, rotate.

Besides, as shown in FIG. 2, an exhaust pipe 59 is connected to the preliminary drying machine 5 for releasing, to the atmosphere, a blow of hot air (a blow at a low temperature) exhausted from the preliminary drying machine 5.

In order to dry an article to be dried 1 using the drying device having the above composition, as shown in FIG. 2, the washed and spin-dried article to be dried 1, which has been transferred by a carrying-in conveyor belt 25, is thrown into the drum 21 of the preliminary drying machine, and then the article to be dried 1 is transferred via the transfer conveyor belts 29, 31 into the rotary drum 13 of the final drying machine 3. In the same way, a next washed and spin-dried article to be dried 1 is thrown into the rotary drum 21 of the preliminary drying machine 5.

Then, after the articles to be dried are thrown in the rotary drums 13, 21, said final drying machine 3 and the preliminary drying machine 5 above are made independent of each other by shutting them through lowering down the shutter 27 provided at the butt portion of the final drying machine 3 and the preliminary drying machine 5. That is to say, while the article to be dried is being dried in the final drying machine 3 and the preliminary drying machine 5 above, the article to be dried 1 and 1a are separated in order not to be mixed by lowering down the shutter 27. Then, a steam heater 15 is operated to supply a blow of hot air at a high temperature into the final drying machine, at the same time a blow of hot air exhausted from the final drying machine 3 is introduced via an exhaust-introducing pipe 7 into the preliminary drying machine 5, and each of the rotary drums 13, 21 is rotated.

Subsequently, the article to be dried 1 is preliminarily dried in the preliminary drying machine 5 by the blow of hot air exhausted from the final drying machine 3, while the article to be dried 1 is dried by the blow of hot air at the high temperature. And, after the article to be dried 1 in the final drying machine is dried out, the final drying machine 3 is stopped resulting in a stop of the preliminary drying machine 5 which is interlocking therewith. After that, the shutter 27 is raised upward to communicate the final drying machine 3 and the preliminary drying machine 5, and the dried article to be dried 1 is carried out by operating the transfer conveyor belt 29 within the final drying machine 3. Then, the preliminarily dried article to be dried 1a is delivered to the final drying machine 3 by operating the transfer conveyor belt 31 within the preliminary drying machine 5. The transfer conveyor belt 29 within the final drying machine 3 is also operated to receive the preliminarily dried article to be dried 1a.

Next, a new washed and spin-dried article to be dried 1 is thrown into the preliminary drying machine 5 by the carrying-in conveyor belt 25. And, the final drying machine 3 and the preliminary drying machine 5 are made independent of each other through lowering down the above shutter 27, and while the blow of hot air is supplied to the final drying machine 3 as the preceding process, the articles to be dried 1, 1a respectively are dried after supplying the blow of hot air exhausted from the final drying machine 3 into the preliminary drying machine. After the article to be dried is dried out, the above steps are repeated again.

Accordingly, in the case of drying device of the present embodiment, since the final drying machine 3 and the preliminary drying machine are located adjacently in series, and since the transfer conveyor belts 29, 31 are provided within the final drying machine 3 and the preliminary drying machine 5 respectively, the preliminarily dried article to be dried 1a can be immediately transferred to the final drying machine 3 for final drying. Therefore, a transfer time of the article to be dried 1 can be reduced remarkably, and the device can also be simplified to realize space-saving.

<Embodiment 3>

Figure 4:
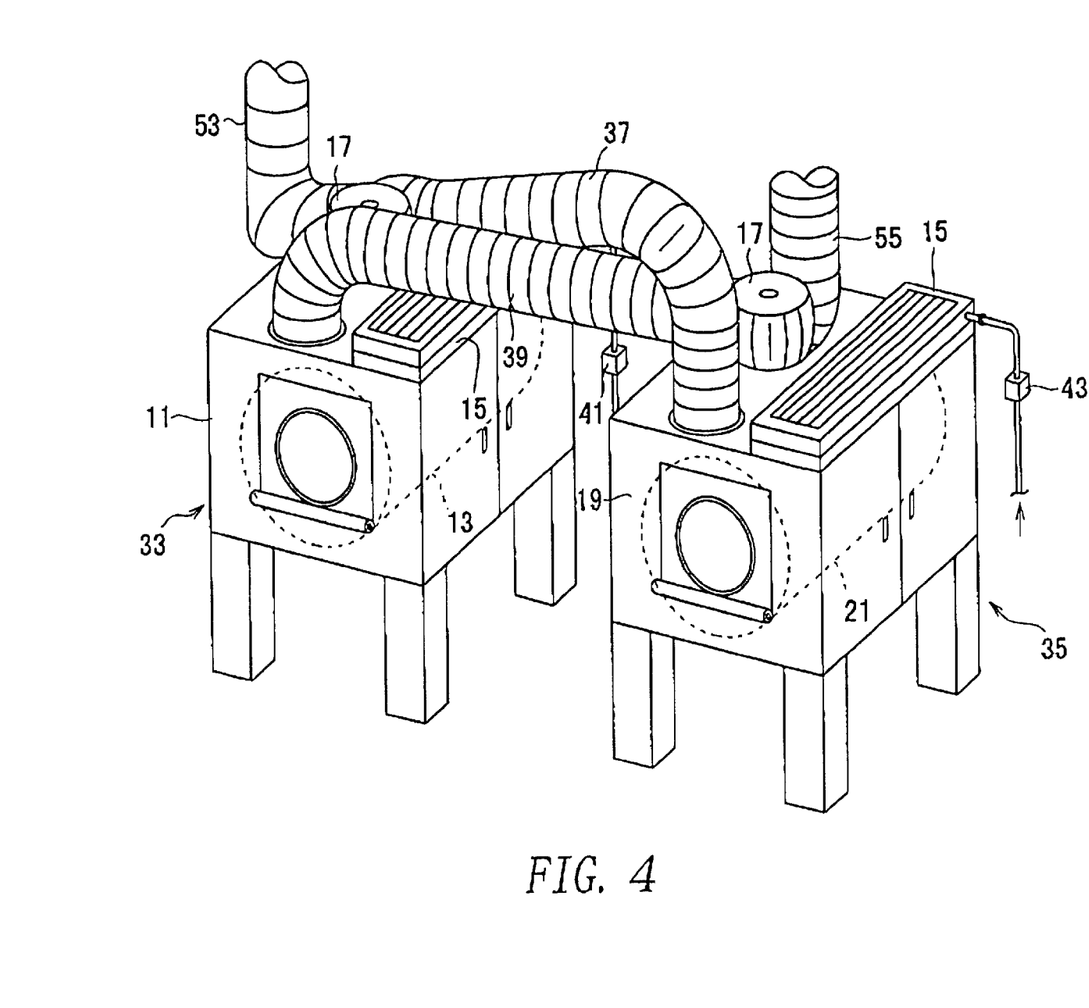
FIG. 4 is a perspective view showing a drying device of the embodiment 3.

A drying device of the present embodiment comprises, as shown in FIG. 4, a 1st drying machine 33, a 2nd drying machine 35 spaced out a prescribed distance from the 1st drying machine 33, exhaust-introducing pipes 37, 39, being exhaust-introducing portions for supplying blows of hot air exhausted from each of the drying machines 33, 35 into the other one of the drying machine 33, 35, respectively, hot air automatic selector valves 41, 43, being hot air switching means able to select either of a supply position and a stop position as for hot air supplied from steam heaters 15, 15, hot air supply means provided on the drying machines 33, 35, exhaust selector damper (not shown in the figure) being exhaust switching means able to select either of a position to release it out into the atmosphere and a position to supply it to each of the drying machines 33, 35, as for hot air emitted from exhaust means provided on each of the drying machines 33, 35.

The 1st drying machine 33 and the 2nd drying machine 35 above are, as shown in FIG. 4, the drying machines of the same type located a prescribed distance apart from each other. Both the 1st drying machine 33 and the 2nd drying machine 35 have the almost same composition as that of the final drying machine 3 of Embodiment 1, comprising, chambers 11, 19, rotary drums 13, 21 free to rotate within the chambers 11, 19, steam heaters 15, 15 for supplying blows of hot air into the chambers 11, 19, and exhaust fans 17, 17 for exhausting interiors of the chambers 11, 19.

Further, since the composition of the 1st drying machine 33 and the 2nd drying machine 35 is the same as that of the final drying machine 3, the explanation for that will be omitted.

The top end of the exhaust-introducing pipe 37 connected to the exhaust fan 17 provided on the above first drying machine 33 is, as shown in FIG. 4, connected onto the top surface of the 2nd drying machine 35, and the pipe acts as supplier of the blow of hot air exhausted from the 1st drying machine 33 into the chamber 19 of the 2nd drying machine 35 concerned. Likewise, the top end of the exhaust-introducing pipe 39 connected to the exhaust fan 17 provided on the 2nd drying machine 35 is connected onto the top surface of the 1st drying machine 33, and the pipe acts as supplier of the blow of hot air exhausted from the 2nd drying machine 35 into the chamber 11 of the 1st drying machine 33 concerned.

And, in addition to the above exhaust-introducing pipes 37, 39, exhaust pipes 53, 55 for releasing out the blows of hot air exhausted from the 1st drying machine 33 and the 2nd drying machine 35 into the atmosphere are also connected to the above exhaust fans 17, 17. Further, the exhaust selector dampers, the illustrations of which have been omitted in the figure, are provided within the exhaust fans 17, 17. Such an exhaust selector damper is able to select either of a position to release out the hot air into the atmosphere and a position to supply it to each of the drying machines 33, 35, as for the hot air exhausted from the exhaust fans 17, 17 provided on both the 1st drying machines 33 and the 2nd drying machine 35.

That is to say, the exhaust selector damper, as shown in FIG. 4, switches over the case where the blow of hot air exhausted via the exhaust fan 17 is supplied to the 2nd drying machine 35 through the above exhaust-introducing pipe 37, to the case where it is released out into the atmosphere through the above exhaust pipe 53. Likewise, the exhaust selector damper switches over the case where the blow of hot air exhausted via the exhaust fan 17 is supplied to the 1st drying machine 33 through the above exhaust-introducing pipe 39, to the case where it is released out into the atmosphere through the above exhaust pipe 55.

The above hot air automatic selector valves 41, 43, as shown in FIG. 4, switches over the blows of hot air supplied by the steam heaters 15, 15 provided on the 1st drying machine 33 and the 2nd drying machine 35, from a position for supplying to a position for stopping.

That is to say, when the 1st drying machine 33 is used as a final drying machine, the hot air automatic selector valve 41 connected to the steam heater 15 of the 1st drying machine 33 is opened to supply steam to the steam heater 15. When the 1st drying machine 33 is used as a preliminary drying machine, on the other hand, the above hot air automatic selector valve 41 is shut off to stop the supply of steam to the steam heater 15. Likewise, when the 2nd drying machine 35 is used as the final drying machine, the hot air automatic selector valve 43 connected to the steam heater 15 of the 2nd drying machine 35 is opened to supply steam to the steam heater 15. When the 2nd drying machine 35 is used as the preliminary drying machine, on the other hand, the above hot air automatic selector valve 43 is shut off to stop the supply of steam to the steam heater 15.

Then, a drying method using the drying device with the above composition will be described. First, after making the 1st drying machine 33 functions as the final drying machine as well as making the 2nd drying machine 35 functions as the preliminary drying machine, the 1st drying machine 33 is made to work as the preliminary drying machine and the 2nd drying machine 35 as the final drying machine. The drying operation is executed by means of sequential repetition of this process.

First of all, the hot air automatic selector valve 41 of the 1st drying machine 33 is opened while the hot air automatic selector valve 43 of the 2nd drying machine 35 is closed. Further, the exhaust selector damper of the 1st drying machine 33 is switched in order to supply the blow of hot air exhausted from the 1st drying machine 33 into a chamber 19 of the 2nd drying machine 35, while the exhaust selector damper of the 2nd drying machine 35 is switched in order to release the blow of hot air exhausted from the 2nd drying machine 35, via the exhaust pipe 55, into the atmosphere.

Then, washed and spin-dried wet articles to be dried 1 (illustrations are omitted) are thrown into the rotary drums 13, 31 respectively of the 1st drying machine 33 and the 2nd drying machine 35.

And, after the preparation for drying is finished as described above, the steam heater 15 of the 1st drying machine 33 is operated to supply the blow of hot air into the chamber 11 and at the same time the rotary drum 13 is rotated. As a result, the article to be dried in the 1st drying machine 33 is dried out by the blow of hot air at a high temperature. Further, this instant, the blow of hot air exhausted from the 1st drying machine 33 is supplied into the chamber 19 of the 2nd drying machine 35 via the exhaust-introducing pipe 37. Within the 2nd drying machine 35, the article to be dried 1 in the rotating rotary drum 21 is preliminarily dried. Besides, the blow of hot air (the blow at a low temperature) exhausted form the 2nd drying machine 35 is released out into the atmosphere via the exhaust pipe 55. When the article to be dried 1 in the 1st drying machine 33 is dried out, the operation of the 1st drying machine 33 is automatically stopped to result in stopping the operation of the 2nd drying machine 35 interlocked therewith. Consequently, the article to be dried 1 in the rotary drum 21 of the 2nd drying machine 35 comes to somewhat dried state.

Next, the finally dried article to be dried 1 is taken out of the 1st drying machine 33, and a washed and spin-dried article to be dried next 1 will be thrown into the rotary drum 13 of the 1st drying machine 33. And, this time, the 2nd drying machine 35, which has been used as the preliminary drying machine in the preceding process, is used as the final drying machine, and the 1st drying machine 33, which ha been used as the final drying machine, is used as the preliminary drying machine. That is to say, the hot air automatic selector valve 43 of the 2nd drying machine 35 is opened while the hot air automatic selector valve 41 of the 1st drying machine 33 is closed. Further, the exhaust selector damper of the 2nd drying machine 35 is switched in order to supply the blow of hot air exhausted from the 2nd drying machine 35 into a chamber 11 of the 1st drying machine 33, while the exhaust selector damper of the 1st drying machine 33 is switched in order to release the blow of hot air exhausted from the 1st drying machine 33, via the exhaust pipe 53, into the atmosphere.

And, the drying is executed under interlocking the 1st drying machine 33 and the 2nd drying machine 35 with each other. Within the 2nd drying machine 35, the preliminarily dried, in preceding process, article to be dried 1 (in somewhat dried state) is finally dried out through supplying he blow of hot air at a high temperature into the chamber 19 by the steam heater 15. Since the article to be dried 1 is in preliminarily dried state here, a drying time for final drying the article to be dried 1 concerned can be reduced. On the other hand, while the article to be dried 1 is preliminarily dried in the 1st drying machine 33 by the blow of hot air exhausted from the 2nd drying machine 35, the blow of hot air exhausted (the blow at a low temperature) from the 1st drying machine 33 is released out into the atmosphere via the exhaust pipe 53.

In this way, by using the method where 1st drying machine 33 is used as the final drying machine and the 2nd drying machine 35 is used as the preliminary drying machine on the other hand, and then the 1st drying machine 33 is used as the preliminary drying machine and the 2nd drying machine 35 is used as the final drying machine, the article to be finally dried next 1 can be preliminarily dried during the final drying and the drying time is remarkably reduced resulting in efficient drying. Further, since transfer means for transferring the preliminarily dried article to be dried 1 to the final drying machine is not necessary, the composition of the device can be simplified and space-saving can be also realized.

Hereinbefore, the concrete embodiment according to the present invention has been described, but the present invention should not be limited to the above embodiment and a number of variations may be available.

Figure 5:
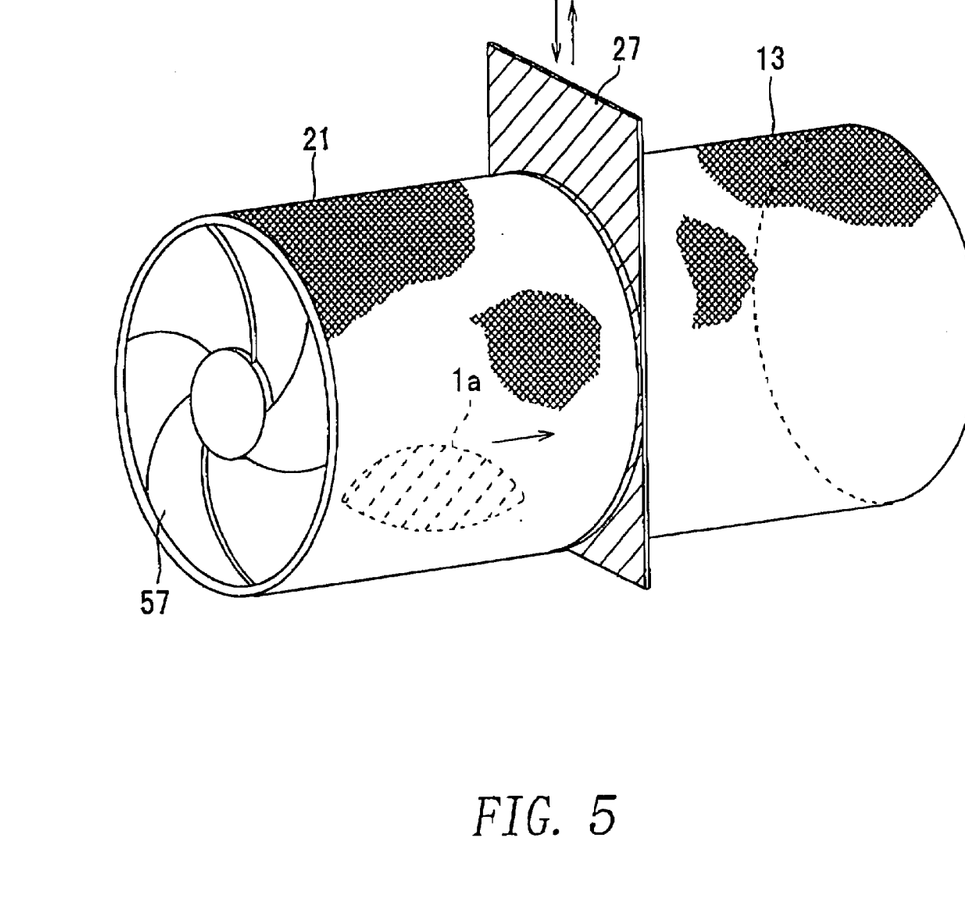
FIG. 5 is a perspective view showing an example of transferring an article to be dried in a preliminary drying machine to a rotary drum of a final drying machine by a blow from a fan.

For instance, as for transfer means for delivering a preliminarily dried article to be dried 1a to a final drying machine, not limiting to the above embodiments, as shown in FIG. 5 for example, a fan 57 is disposed being free to be opened and to be closed at a inlet opening for throwing an article to be dried 1 into a rotary drum 21 of a preliminary drying machine 5. The fan 57 is disposed being free to be opened and to be closed by means of a hinge etc. at the inlet opening of the rotary drum 21, and the fan 57 is removed to open the inlet opening when the article to be dried 1 is thrown into the rotary drum 21, and the inlet opening is shut off by means of the above fan 57 during drying operation.

And, for transferring the preliminarily dried article to be dried 1a within the rotary drum 21 of the above preliminary drying machine to a rotary drum 13 of a final drying machine 3, a blow toward a 2nd drying machine 35 is generated by rotating the above fan 57, and the above article to be dried 1a is forced to transfer thereto by the blow. In this way, the composition of the device becomes simpler than that of a device wherein transfer conveyor belts 29, 31 are provided within the rotary drums 13, 21 respectively.

In the above case, the preliminarily dried article to be dried 1a is forced to transfer to the final drying machine 3 directly by the blow of he fan 57, but it is also preferable that by means of providing screw-shaped fins in the rotary drum 21 of the above preliminary drying machine 5, the above article to be dried 1a is forced to transfer to the final drying machine 3, by blowing the hot air from the above fan 57 against the above article to be dried 1a and by rotating the rotary drum 21 of the preliminary drying machine 5. For example, the article to be dried 1a is transferred toward the fan 57 when the rotary drum 21 is rotated clockwise, and the article to be dried 1a is transferred, on the contrary, toward the final drying machine 3 when the rotary drum 21 is rotated counterclockwise.

Figure 6:
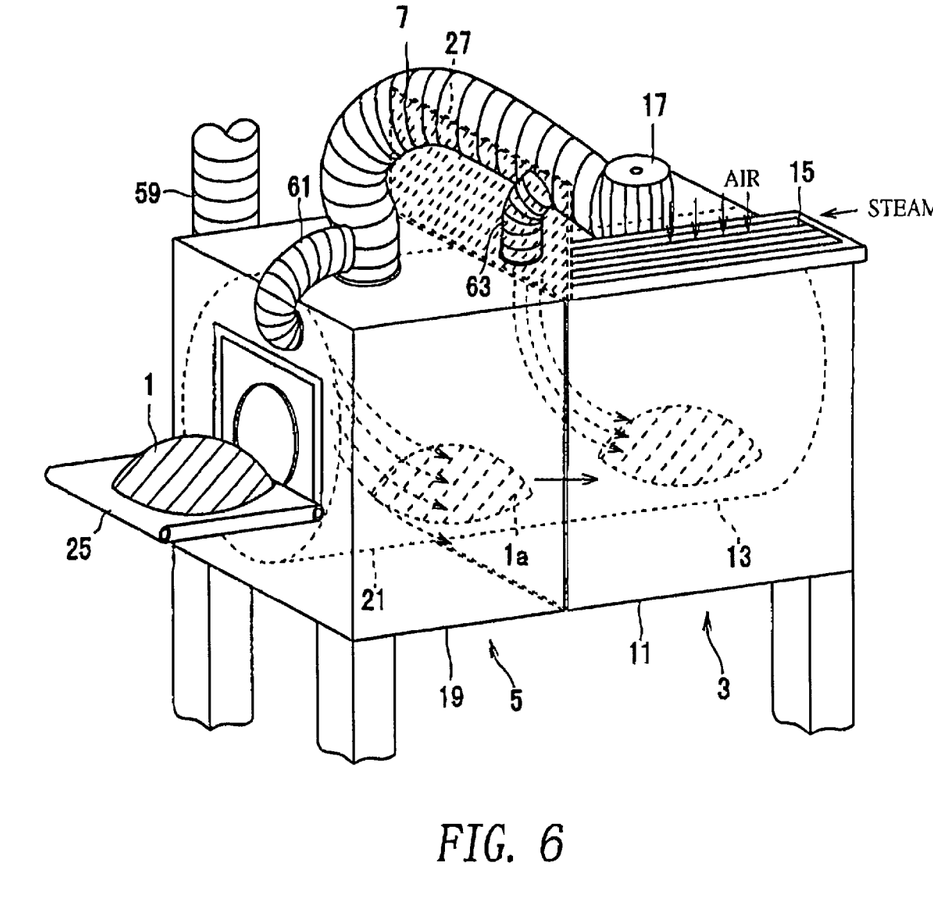
FIG. 6 is a perspective view showing an example of transferring an article to be dried in a preliminary drying machine to a rotary drum of a final drying machine by a blow of hot air exhausted from the final drying machine.

Further, as shown in FIG. 6, a preliminarily dried article to be dried 1a in a preliminary drying machine 5 is transferred into a final drying machine 3, by utilizing a blow of hot air exhausted from the final drying machine 3 through adding some improvements on the drying device shown in FIG. 2. That is to say, branch pipes 61, 63 are provided to extend each of their end portions up from an exhaust-introducing pipe 7 connected to an exhaust fan 17 of the final drying machine 3 down to each front portion of the drying machines 3, 5 respectively, and exhaust selector dampers (not shown in the figure) are provided at the junctions of the branch pipes 61, 63 and the exhaust-introducing pipe 7.

While final drying and preliminary drying are proceeding, the above exhaust selector damper is switched to prevent the blow of hot air from getting into the branch pipes 61, 63. And, after completion of final drying and preliminary drying, the article to be dried 1 is taken out from the final drying machine 3, and the above exhaust selector damper is switched over in order to make the hot air exhausted from the final drying machine 3 flow through the branch pipes 61, 63. And, after lifting upward a shutter 27, the hot air is blown down into the rotary drum 21 of the preliminary drying machine 5 through branch pipes 61, 63. The article to be dried 1a contained in the rotary drum 21 is transferred to the final drying machine 3 by the blow of hot air from the above branch pipes 61, 63.

Besides, although the branch pipe 63 is provided in the front portion of the final drying machine 3, the branch pipe 63 provided in the front portion of the final drying machine 3 is not necessary, if the preliminarily dried article to be dried 1a can be transferred to the final drying machine 3 only by the blow of hot air supplied through the branch pipe 61 connected to the preliminary drying machine 5.

Otherwise, it is also preferable that after final drying and preliminary drying are completed, the finally dried article to be dried 1 is discharged by the blow of hot air through the branch pipe 63 provided in the front portion of the final drying machine 3 by switching over the exhaust selector damper and then the preliminarily dried article 1a to be dried is transferred to the final drying machine 3 by lifting up the shutter 27 and also by the blow of hot air through the branch pipe 61 provided in the front portion of the preliminary drying machine 5.

In this a way, since the preliminarily dried article to be dried 1a is transferred to the final drying machine 3 utilizing the blow of hot air exhausted from the final drying machine 3, the device can be composed using a simple configuration of providing the branches 61, 63 only, and a more simplified composition of the device can be achieved.

Figure 7:
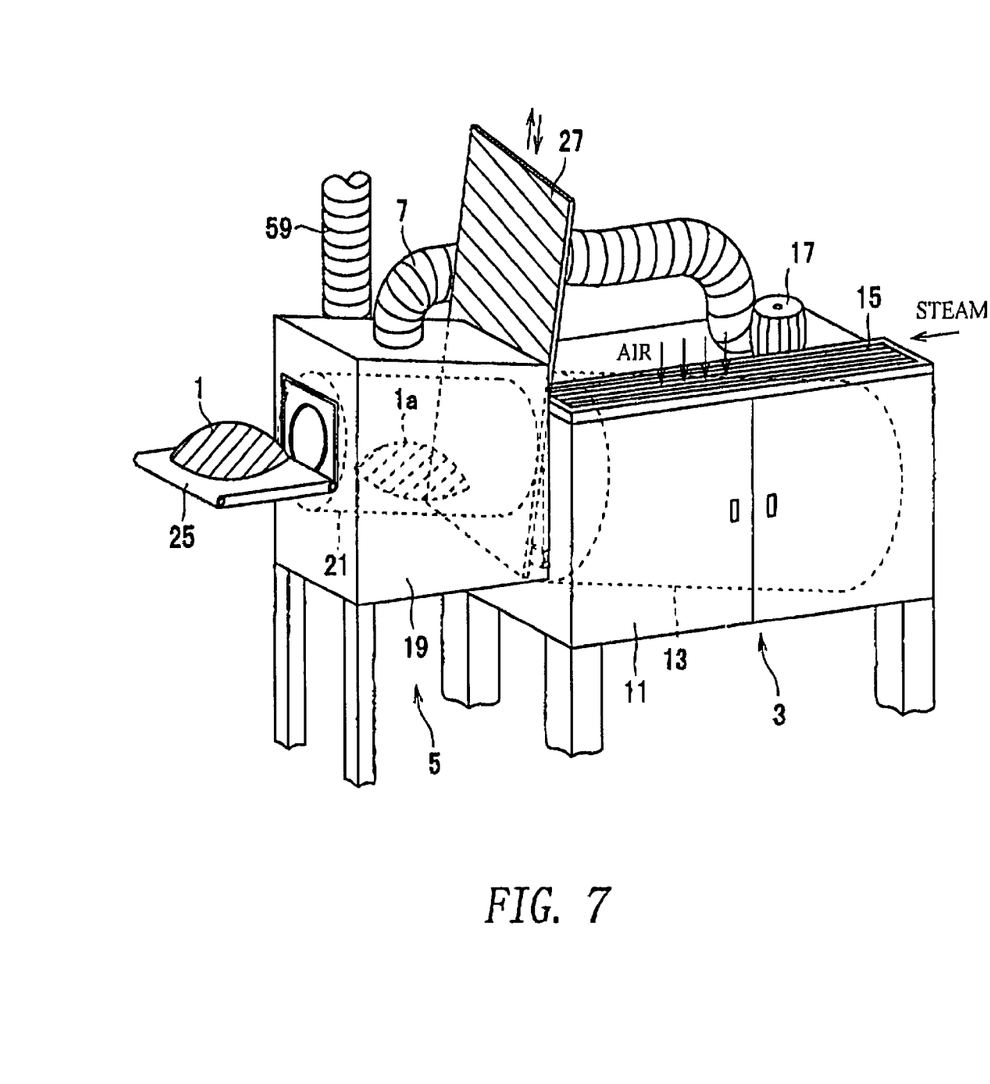
FIG. 7 is a perspective view showing an example of transferring an article to be dried in a preliminary drying machine sliding down to a rotary drum of a final drying machine by tilting a rotary drum of the preliminary drying machine.

Further, as shown in FIG. 7, a preliminary drying machine 5 is placed on a little higher level than a final drying machine 3, and each of rotary drums 13, 21 of the final drying machine 3 and the preliminary drying machine 5 is set at the inclined position. The rotary drum 13 of the final drying machine 3 and the rotary drum 21 of the preliminary drying machine 5 is inclined at such a positional relationship that an article to be dried 1a within the rotary drum 21 of the preliminary drying machine 5 may slide smoothly down into the rotary drum 13 of the final drying machine 3.

After completion of final drying and preliminary drying, the operation of the final drying machine 3 and the preliminary drying machine 5 is stopped, and the preliminarily dried article to be dried 1a is made to slide down, owing to its own weight, into the rotary drum 13 of the final drying machine 3, by lifting up diagonally the shutter 27 located at the butt portion of the final drying machine 3 and the preliminary drying machine 5. In this way, preparation of another transfer means becomes unnecessary, if the article to be dried 1a slides down owing to its own weight into the rotary drum 13 of the final drying machine 3 by setting the rotary drums 13, 21 inclined.

Figure 8:
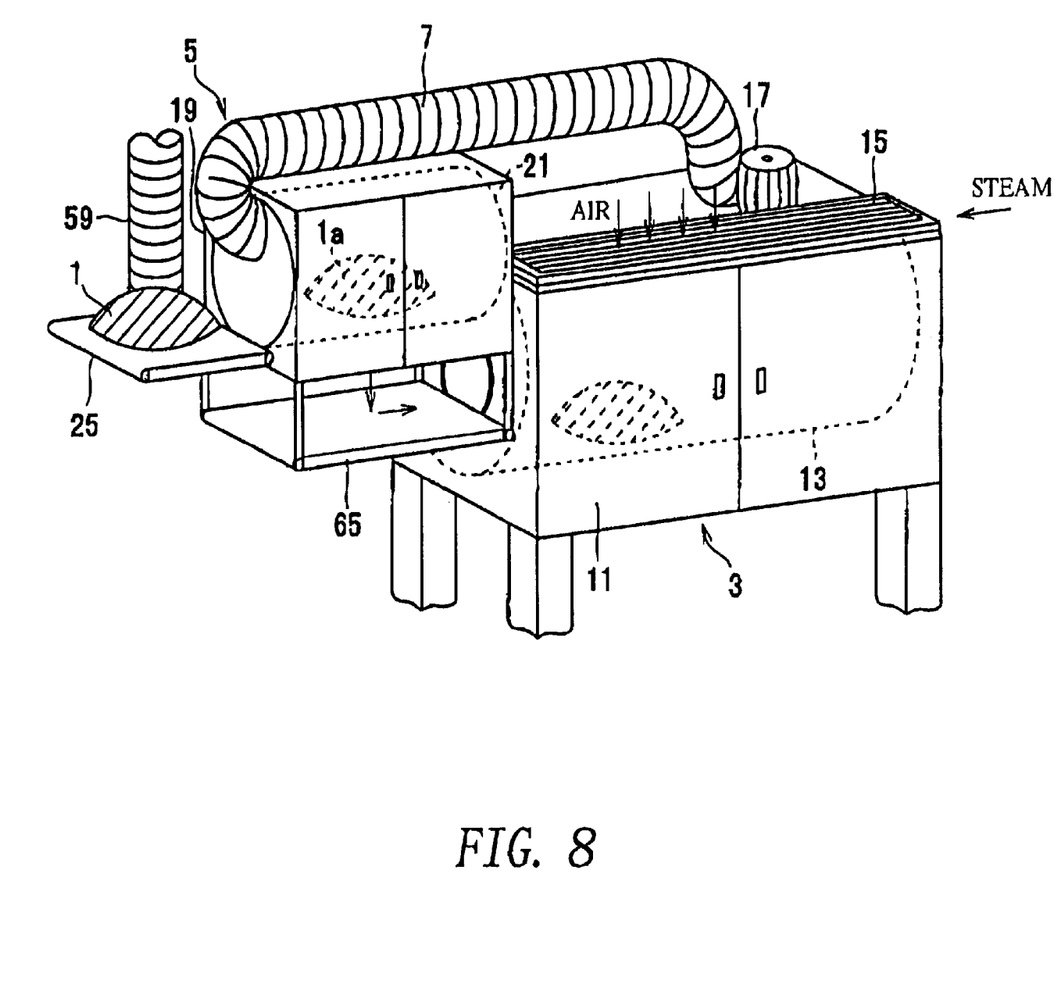
FIG. 8 is a perspective view showing an example of transferring an article to be dried in a preliminary drying machine dropping down on a transfer conveyor belt to a rotary drum of a final drying machine by the transfer conveyor belt which is provided at the bottom of the preliminary drying machine.

Further, as shown in FIG. 8, while a preliminary drying machine 5 is placed on a little higher level than a final drying machine 3, a transfer conveyor belt 65 is provided on a bottom portion of the preliminary drying machine 5. Such a transfer conveyor belt 65 is placed at a position where an article to be dried 1a can be transferred smoothly to an opening of the final drying machine 3. And, a preliminarily dried article to be dried 1a is transferred to the final drying machine 3 utilizing the transfer conveyor belt 65.

That is to say, a bottom portion of a chamber 19 of the preliminary drying machine 5 is opened, and through the opening, the article to be dried 1a is dropped down on the transfer conveyor belt 65 placed thereunder. When the article to be dried 1a is laid on the transfer conveyor belt 65, it is supplied into a rotary drum 13 of the final drying machine 3 by operating the transfer conveyor belt 65. In this way, the device can get along with the only one transfer conveyor.

Additionally, although the conveyor belts have been employed as a conveyor in all the embodiments above, a conveyor belt is not the only possible means of use.

The present invention is practiced in the embodiments illustrated hereinbefore, and has the effects described hereinafter.

According to a drying method of the present invention, while a blow of hot air is supplied to a final drying machine so as to finally dry an article to be dried, a blow of hot air exhausted from the final drying machine is introduced into a preliminary drying machine so as to preliminarily dry the article to be dried before final drying, and then the article to be dried contained in the preliminary drying machine is transferred to said final drying machine for final drying, and hence the article to be dried next can be preliminarily dried while final drying is proceeding, resulting in an increased in drying efficiency, through both the effective utilization of a standby time for the article to be dried before final drying and the remarkable reduction in a drying time. Since the hot air exhausted from the final drying machine can be utilized effectively, energy-saving may be attempted.

Further, according to a drying method of the present invention, a blow of hot air is transferred into a 1st drying machine to dry finally an article to be dried, and at the same time a blow of hot air exhausted from the 1st drying machine is introduced into a 2nd drying machine to preliminarily dry an article to be dried before final drying, and then the blow of hot air is stopped to transfer into the 1st drying machine, and the blow of hot air is transferred into the second drying machine to dry the preliminarily dried article to be dried, and at the same time the blow of hot air exhausted from the 2nd drying machine is introduced into the 1st drying machine to preliminarily dry the new article to be dried before final drying, and hence the article to be dried can be dried efficiently because of a remarkable reduction in a drying time and no need for laborious operation of transferring the preliminarily dried article to be dried to another drying machine.

On the other hand, according to a drying device of the present invention, since the device comprises a preliminary drying machine located adjacently to a drying machine for finally drying an article to be dried, an exhaust-introducing portion for introducing a blow of hot air exhausted from said drying machine into the preliminary drying machine, and transfer means for transferring the preliminarily dried article to be dried in the preliminary drying machine into said drying machine, the next article to be finally dried can be preliminarily dried while final drying is still proceeding, and the preliminarily dried article to be dried can be transferred into said drying machine by said transfer means.

Again, according to a drying device of the present invention, since a drying machine for final dying and a preliminary drying machine are placed adjacently in series and transfer means is disposed within said drying machine and/or within said preliminary drying machine, a preliminarily dried article to be dried can be transferred directly to the final drying machine without being taken out from the preliminary drying machine.

According to a drying machine of the present invention, since the drying machine comprises hot air supply means for supplying a blow of hot air into a chamber containing a rotary drum, exhaust means for exhausting the interior of said chamber, and, as for hot air emitted from said exhaust means, exhaust switching means able to select either of the position to release it out into the atmosphere and a position to supply it to a preliminary drying machine, consequently the hot air emitted from the drying machine can be supplied into the preliminary drying machine by means of connecting the drying machine to the preliminary drying machine, and hence an article to be dried thrown in the preliminary drying machine can be preliminarily dried by said blow of hot air.

What is claimed is:

1. A drying method comprising the following steps:

supplying a blow of hot air into first drying machine to dry finally an article to be dried and introducing a blow of hot air exhausted from said first drying machine into said second drying machine to preliminarily dry an article to be dried before final drying;

stopping to supply said blow of hot air into said first drying machine;

supplying a blow of hot air into said second drying machine to dry finally said preliminarily dried article to be dried and introducing a blow of hot air exhausted from said second drying machine into the first drying machine to preliminarily dry a new article to be dried before final drying.

2. A drying device comprising:

a pair of drying machines, each of them having a rotary drum free to rotate in a chamber, hot air supply means for supplying a blow of hit air into said chamber, and exhaust means for exhausting the interior of said chamber;

exhaust-introducing members, each of them supplying a blow of hot air emitted by said exhaust means from one drying machine to the other drying machine, and from the other drying machine to the one drying machine, respectively;

exhaust switching means being able to select either of a mode to release hot air out into the atmosphere and a mode to supply the hot air to said drying machine, as for the hot air emitted by said exhaust means of either of said drying machines.

3. A drying device comprising:

a first drying machine and a second drying machine supplying a blow of hot air to dry an article to be dried;

first exhaust means and second exhaust means included in each of said first drying machine and said second drying machine respectively for exhausting the interior of each drying machine; and a first exhaust-introducing member for supplying a blow of hot air emitted by said first exhaust means to the second drying machine, and a second exhaust-introducing member for supplying a blow of hot air emitted by said second exhaust means to the first drying machine, wherein:

in case of supplying the blow of hot air emitted by said first exhaust means to said second drying machine, the blow of hot air emitted by said second exhaust means is released out into the atmosphere; and in case of supplying the blow of hot air emitted by said second exhaust means to said first drying machine, the blow of hot air emitted by said first exhaust means is released out into the atmosphere.

4. A drying device comprising:

a drying machine to dry finally an article to be dried;

a preliminary drying machine to dry preliminarily an article to be dried before final drying, the preliminary drying machine being placed in such configuration that a feeding inlet of said drying machine and a discharging outlet of said preliminary drying machine are adjacently located to communicate with each other;

a shutter being provided, free to open or close, between the feeding inlet of said drying machine and the discharging outlet of said preliminary drying machine;

a exhaust-introducing member for introducing a blow of hot air exhausted from said drying machine to said preliminary drying machine; and a branch pipe for introducing the blow of hot air to said preliminary drying machine, the branch pipe being selectively branched from said exhaust-introducing member, and the branch pipe being introduced into said preliminary drying machine at a position farther distance apart than an introduced position of said exhaust-introducing member from said drying machine, wherein a preliminarily dried article to be dried is transferred to said drying machine through introducing the blow of hot air via said branch pipe by opening said shutter.

\* \* \* \* \*